United States Patent
Rahman et al.

(10) Patent No.: US 8,249,549 B1
(45) Date of Patent: Aug. 21, 2012

(54) AUTOMATING EMERGENCY CALLS GLOBALLY

(75) Inventors: Iftekhar Rahman, Billerica, MA (US); Kika Konstantinou, New York, NY (US)

(73) Assignee: Cellco Partnership, Basking Ridge, NJ (US)

( * ) Notice: Subject to any disclaimer, the term of this patent is extended or adjusted under 35 U.S.C. 154(b) by 127 days.

(21) Appl. No.: 12/889,093

(22) Filed: Sep. 23, 2010

(51) Int. Cl.
*H04W 88/02* (2009.01)

(52) U.S. Cl. .................................................. 455/404.2

(58) Field of Classification Search .................. 455/415, 455/404.2, 445, 558, 564; 379/114.21, 201.02
See application file for complete search history.

(56) References Cited

U.S. PATENT DOCUMENTS

| | | | | |
|---|---|---|---|---|
| 2006/0276226 | A1* | 12/2006 | Jiang | 455/558 |
| 2009/0124291 | A1* | 5/2009 | Cha | 455/564 |
| 2009/0149220 | A1 | 6/2009 | Camilleri et al. | |
| 2009/0279683 | A1* | 11/2009 | Gisby et al. | 379/201.02 |
| 2010/0322400 | A1* | 12/2010 | Katzenstein | 379/114.21 |
| 2011/0070890 | A1* | 3/2011 | Wu | 455/445 |

OTHER PUBLICATIONS

"Telephone numers in Europe," Sep. 22, 2010 en.wikipedia.org/wiki/Telephone_numbers_in_Europe>.
"List of country calling codes," Sep. 22, 2010 en.wikipedia.org/wiki/List_of_country_calling_codes>.
"Telephone numbering plan" Sep. 22, 2010 ://en.wikipedia.org/wiki/Telephone_numbering_plan>.
"List of international call prefixes," Sep. 22, 2010 en.wikipedia.org/wiki/List_of_international_call_prefixes>.
Complete Application history of U.S. Appl. No. 12/889,076, filed Sep. 23, 2010 entitled Assisting a User to Store and Place a Call Back to Received International Number.
Complete Application history of U.S. Appl. No. 12/636,240, filed Dec. 11, 2009 entitled Determining Mobile Station Operating Country to Enable System Selection or Other Location Based Device Featurees Without Network Assistance.
Complete Application history of U.S. Appl. No. 12/562,680, filed Sep. 18, 2009 entitled Enabling an Assisted Dialing on a Mobile Device.

* cited by examiner

*Primary Examiner* — Diane Mizrahi (57) ABSTRACT

Automating emergency calls globally involves receiving, from a user and at a mobile device, a number associated with an outgoing call; identifying, at the mobile device, the received number is a first emergency number; and identifying, at the mobile device, a country associated with the first emergency number. The mobile device also identifies a country of operation of the mobile device at a time of receiving the first emergency number. The device then determines whether the country of operation corresponds to the country associated with the first emergency number. Upon determining that the country of operation does not correspond to the country associated with the first emergency number, a second emergency number associated with the country of operation is determined. The mobile device transmits the second emergency number to a wireless network servicing the mobile device, instead of the first emergency number, to initiate the emergency call.

17 Claims, 4 Drawing Sheets

AUTOMATING EMERGENCY CALLS GLOBALLY

TECHNICAL FIELD

The present discussion relates to technologies for automating emergency calls globally.

BACKGROUND

In recent years, use of mobile communications devices for voice telephone services, e-mail or text messaging services and even multi-media services has become commonplace, among mobile professionals and throughout the more general consumer population. Mobile services provided through public cellular or Personal Communication Service ("PCS") type networks, particularly for voice telephone service, has become virtually ubiquitous across much of the world.

A user of the mobile device usually enters a telephone number into the mobile device or retrieves a number from a contact list stored in the device to initiate a call or a message transmission to a particular destination. The dialing patterns are country specific and apply whether the user is dialing from a mobile device or from a landline. As such, it is important for the mobile user to dial or select a destination number in a correct dialing pattern as the mobile user roams from one country to another country.

This includes correctly dialing the appropriate number(s) for emergency calls. For example, in the United States the user is required to dial 911 if the user requires emergency services. Unfortunately, 911 is not a globally used number. Different countries have different emergency numbers. In addition, some countries may have separate numbers for medical, fire, and police emergency answering services. It would be inconvenient for the user to remember these different numbers when traveling overseas.

Therefore, there is need for a method that takes the chore of having to remember these emergency numbers from the user.

SUMMARY

In one general aspect, a method global automates an emergency call. The method includes steps of receiving, from a user and at a mobile device, a number associated with an outgoing call; identifying, at the mobile device, the received number is a first emergency number; and identifying, at the mobile device, a country associated with the first emergency number. The method further includes steps of identifying a country of operation of the mobile device at a time of receiving the first emergency number; and determining whether the country of operation corresponds to the country associated with the first emergency number. Upon determining that the country of operation does not correspond to the country associated with the first emergency number from the user, a second emergency number associated with the country of operation is determined. The mobile device transmits the second emergency number to a wireless network servicing the mobile device, instead of the first emergency number, to initiate the emergency call.

The above general aspect may include one or more of the following implementation features. The first emergency number may be 911, 112, or 999, and the country associated with the first emergency number may be United States, Greece, or Bangladesh. The first emergency number may an emergency number associated with a home country of the mobile device. Identifying the received number is the first emergency number may include programming the mobile device to compare the received number with a plurality of emergency numbers stored in the mobile device and based on the result of comparison determine that the received number is the first emergency number, and the plurality of emergency numbers include at least one of 911, 112, and 999. Identifying the country of operation may include identifying a country of operation utilizing a Global Positioning System ("GPS").

The step of determining the second emergency number may include referencing a table listing one or more emergency numbers associated with the country of operation. The step of determining the second emergency number may include determining a plurality of emergency numbers associated with the country of operation; displaying to the user of the mobile device the plurality of emergency numbers associated with the country of operation; requesting the user of the mobile device to select one of the plurality of emergency numbers associated with the country of operation, and in response to the request, receiving a selection of a particular emergency number from among the plurality of emergency numbers associated with the country of operation. The step of automatically replacing the first emergency number may use the particular emergency number as the second emergency number.

Implementations of the described techniques may include hardware, such as an appropriately configured mobile device, a method or process, or software for a mobile device on a computer-accessible medium.

The details of one or more implementations are set forth in the accompanying drawings and the description below. Other features will be apparent from the description and drawings, and from the claims.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Emergency calls are automated globally for users who may roam internationally. The technologies described below enable a user to dial an emergency number and have the device use the correct emergency number depending upon the country that the mobile device is in even if the user dials an emergency number associated with another country. In addition, if the user is in a country that includes separate emergency numbers for medical, fire, police emergency calls, the exemplary device gives the user the ability to select the right emergency answering point and places the call accordingly without the user being required to remember the numbers that need to be dialed.

This approach takes the chore of having to remember the emergency numbers of different countries from the user. The user may have to remember to dial one number. For example, the user may only have to remember to dial the emergency number associated with his/her home country. In one specific example, if the user lives in the United States, the user can dial 911 irrespective of whether or not the user is in the United States at the time of an emergency. Once the user dials 911, the device depending upon the country it is in will determine the appropriate emergency number for that country and will use the correct dial digits to place the emergency call. In addition, if the user dials 911 in a country that has separate numbers for medical, fire, and police emergency services, then the device may provide an option to the user for choosing the desired emergency service. Once the user selects the desired emergency service, the device will place the call accordingly.

Figure 1:
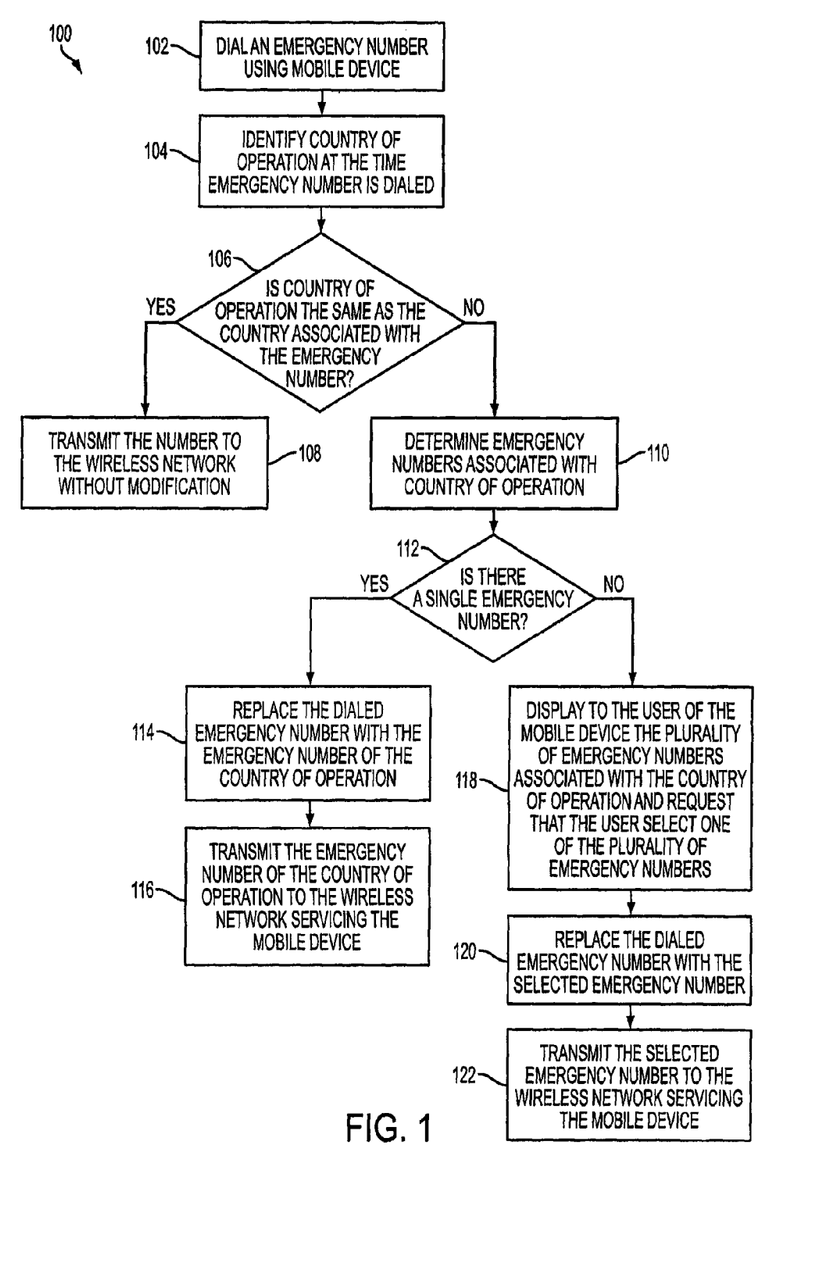
FIG. 1 illustrates an exemplary process for automating emergency calls globally.

With this overview, reference now is made in detail to the examples illustrated in the accompanying drawings and discussed below. FIG. 1 illustrates an exemplary process 100 for automating emergency calls globally. The process 100 may begin with the user dialing an emergency number using the mobile device (Step 102). In keeping with the previous example, assuming the user's home country is the United States, the user dials 911. In one implementation, the mobile device is designed to recognize the emergency number (e.g., 911) associated with its home country. In another implementation, the mobile device is programmed to recognize a plurality of emergency numbers, which include 911, 112, and 999. To this end, the mobile device may include a table listing the emergency numbers 911, 112, and 999 and their corresponding country (e.g., United States, Greece, and Bangladesh, respectively). The mobile device compares the received number with the emergency numbers stored in the table to identify whether the received number is one of 911, 112, or 999. In keeping with the previous example, the mobile device identifies that the received number is 911 and the country associated with 911 is the United States.

The mobile device may next identify a country of operation of the mobile device at a time 911 is inputted therein (Step 104). In one example, the mobile device identifies the country of operation utilizing a Global Positioning System ("GPS"). However, the mobile device may use other methods to identify the country of operation as discussed in U.S. patent application Ser. No. 12/636,240, the entire content of which is incorporated herein by reference.

Once the country of operation is determined, the mobile device determines whether the country of operation corresponds to the country associated with the emergency number 911 (e.g., the United States) (Step 106). If the mobile device determines that the country of operation is the country associated with the emergency number 911 (e.g., the United States) (Step 106, Yes), the mobile device transmits the number to the wireless network servicing the mobile device without modification (Step 108). If the country of operation is not the country associated with the emergency number 911 (Step 106, No), the mobile device determines an emergency number associated with the country of operation (Step 110). The mobile device may reference tables in Appendix A to identify the emergency number associated with the country of operation. The tables in Appendix A include a list of emergency numbers associated with different countries. The information contained in the tables are publicly available and can be found on the Internet on Wikipedia at the wild entry for Emergency_telephone_number.

The mobile device determines whether the country of operation includes a single emergency number (Step 112). If yes (Step 112, Yes), the mobile device automatically replaces 911 number with the emergency number for the country of operation (Step 114). The mobile device then transmits the emergency number for the country of operation to the wireless network servicing the mobile device (Step 116), to initiate the emergency call. If the country of operation uses a plurality of emergency numbers (Step 112, No), the mobile device displays the emergency numbers associated with the country of operation to the user and prompts the user to select one of the displayed emergency numbers associated with the country of operation (Step 118). For example, a drop down menu may show the user the various options for emergency services in the country of operation. The mobile device receives a selection of a particular emergency number from among the plurality of emergency numbers in the country of operation, and the mobile device automatically replaces the 911 number with the selected emergency number (Step 120) and transmits the selected emergency number to the wireless network servicing the mobile device (Step 122) to initiate the emergency call.

Figure 2:
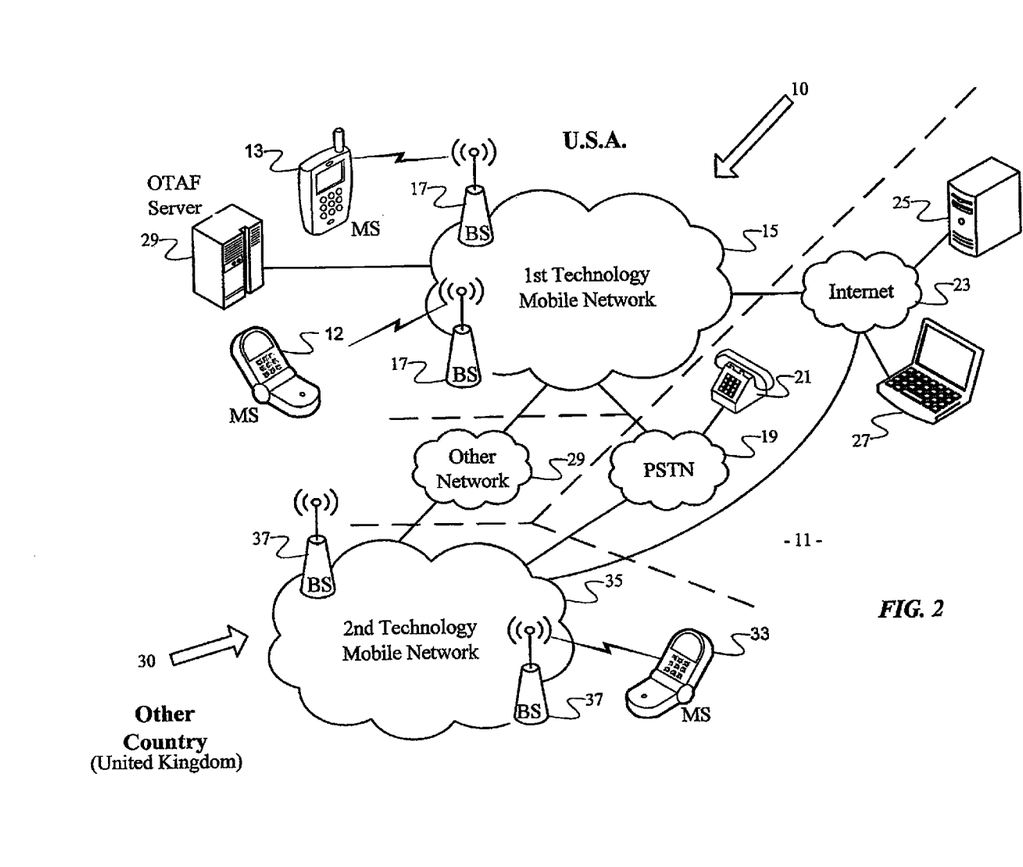
FIG. 2 is a functional block diagram of an exemplary system of wireless networks for providing mobile voice telephone services and various data services, useful in explaining a context in which automating emergency calls globally may be desirable FIG. 3 provides a block diagram illustration of an exemplary wireless device capable of implementing automatic emergency dialing globally using one or more of the exemplary techniques discussed herein.

FIG. 2 is a functional block diagram of an exemplary system of wireless networks for providing mobile voice telephone services and various data services. For discussion purposes, the diagram shows two wireless networks 10 and 30 operated in accord with different technology standards. The networks 10 and 30 often (but not always) may be operated by different providers, carriers or operators. The communication networks 10 and 30 implementing the illustrated system provide mobile voice telephone communications as well as other services such as text messaging and various multimedia packet data services, for numerous mobile devices. For purposes of later discussion three mobile devices 12, 13 and 33 appear in the drawing. The elements indicated by the reference numerals 10 and 30 generally are elements of the respective operator's network, although the mobile devices 12, 13 and 33 typically are sold to the carrier's customers.

Today, mobile devices typically take the form portable handsets, smart-phones or personal digital assistants, data cards for computers, although they may be implemented in other form factors. Each mobile communication network 10 or 30 provides communications between mobile devices 12, 13 and 33 as well as communications for the mobile devices with other networks and stations shown generally at 11 outside the mobile communication networks. An inter-carrier or other intermediate network 29 may provide communication connectivity between the mobile communication networks 10 and 30.

Each network 10, 30 allows users of the mobile devices operating through the respective network to initiate and receive telephone calls to each other as well as through the public switched telephone network ("PSTN") 19 and telephone stations 21 connected thereto. One or both of the networks typically offers a variety of text and other data services, including services via the Internet 23, such as downloads, web browsing, e-mail, etc. via servers shown generally at 25 as well as message communications with terminal devices represented generally by the personal computer 27.

The networks 10 and 30 are generally similar, except in our example, they offer respective services via two different wireless communication technologies. For purposes of an example for discussion here, we will assume that the network 10 is a 3GPP2 (1XRTT and EVDO) technology network, whereas the network 30 is a 3GPP (LTE/GSM/UMTS) technology network. In one implementation, the networks 10, 30 are operated in one country. In another example, the networks 10, 30 are operated in different countries. In one specific example, network 10 is operated in the United States and the network 30 is operated in United Kingdom.

The mobile communication network 10 typically is implemented by a number of interconnected networks. Hence, the overall network 10 may include a number of radio access networks ("RANs"), as well as regional ground networks interconnecting a number of RANs and a wide area network ("WAN") interconnecting the regional ground networks to core network elements. A regional portion of the network 10, such as that serving mobile device 13 will typically include one or more RANs and a regional circuit and/or packet switched network and associated signaling network facilities.

Physical elements of a RAN operated by one of the mobile service providers or carriers, include a number of base stations represented in the example by the base stations ("BSs") 17. Although not separately shown, such a base station 17 typically comprises a base transceiver system ("BTS") which communicates via an antennae system at the site of base station and over the airlink with one or more of the mobile devices 13, when the mobile devices are within range. The BTS is the part of the radio network that sends and receives RF signals to/from the mobile devices that the base station currently serves. Hence, in our example, the BTS would utilize 3GPP2 (1XRTT and EVDO) type transceiver equipment and implement communications in accord with the protocols of the applicable 3GPP2 standard, for signaling, registration, voice communication, data communication, etc. For example, each base station 17 will broadcast certain standardized information to allow a mobile device 12 or 13 in the region to search for, find and lock-onto the base station 17 and acquire information needed to register and initiate communications via the network 10, all in accord with the standard 3GPP2 protocols.

The radio access networks also include a traffic network represented generally by the cloud at 15, which carries the user communications for the mobile devices 12, 13 between the base stations 17 and other elements with or through which the mobile devices communicate. Individual elements such as switches and/or routers forming the traffic network 15 are omitted here for simplicity. Although not separately shown, the network 15 will include or connect with a number of service control elements, for authenticating mobile devices to use the network 10, for authenticating mobile device users and/or for authorizing users or devices to access various services and service features offered by the particular network 10, and for usage accounting and billing functions.

The traffic network portion 15 of the mobile communication network 10 connects to a public switched telephone network 19. This allows the network 10 to provide voice grade call connections between mobile devices and regular telephones connected to the PSTN 19. The drawing shows one such telephone at 21. The traffic network portion 15 of the mobile communication network 10 also connects to a public packet switched data communication network, such as the network commonly referred to as the "Internet" shown at 23. Packet switched communications via the traffic network 15 and the Internet 23 may support a variety of user services through the network 10, such as mobile device communications of text and multimedia messages, e-mail, web surfing or browsing, programming and media downloading, etc. For example, the mobile devices may be able to receive messages from and send messages to user terminal devices, such as personal computers, either directly (peer-to-peer) or via various servers 25. The drawing shows one user terminal device as a personal computer ("PC") at 27, by way of example.

The carrier or service provider that operates the network 10 will also operate a number of systems that provide ancillary functions in support of the communications services provided through the network 10, and those elements communicate with other nodes/elements of the network 10 via one or more private IP type packet data networks or Intranets (not separately shown). Such systems maintain various records used for authentication and authorization functions and provisioning necessary information into the mobile devices to enable they operation via the network 10. Of note for purposes of the present discussion, one or more such systems provide the capability to download a program for automating emergency calls globally into the mobile devices of the network operator, in this example, via the networks. An example of such a system that may facilitate programming and/or downloading via the networks is the Over-The-Air service activation/provisioning Function ("OTAF") 29. In the example, the OTAF 29 may be a server connected to the traffic network 15, to enable the server to communicate with the mobile devices of the network operator's customer and program the mobile devices for automatic emergency dialing globally.

As noted earlier, many mobile wireless communications networks have been deployed and are available today. For purposes of discussion the example of FIG. 2 shows a second mobile network 30. In our example, the network 30 is operated by a different carrier or service provider than the operator of network 10. In some areas, the second network 30 could utilize the same wireless technology as the network 10, but in our example, the network 30 utilizes a different wireless network technology. The network 10 is a 3GPP2 (1XRTT and EVDO) technology network, and in the example, the network 30 is a 3GPP (LTE/GSM/UMTS) technology network.

Like the network 10, the physical elements of RAN 30 include a number of BSs 37, each of which includes a BTS and associated antenna system. In our example, each BTS of BS 37 would utilize 3GPP (LTE/GSM/UMTS) type transceiver equipment and implement communications in accord with the protocols of the applicable 3GPP standard, for signaling, registration, voice communication, data communication, etc. For example, each BS 37 will broadcast certain standardized information to allow a mobile device 12 or 33 in the region to search for, find and lock-onto the base station 37 and acquire information needed to register and initiate communications via the network 30, all in accord with the standard 3GPP protocols.

The radio access network portions of network 30 also include a traffic network represented generally by the cloud at 35, which carries the user communications for the mobile devices 12, 33 between the base stations 37 and other elements with or through which the mobile devices communicate. Individual elements such as switches and/or routers forming the traffic network 35 are omitted here for simplicity. Although not separately shown, the network 35 will include or connect with a number of service control elements, for authenticating mobile devices to use the network 30, for authenticating mobile device users and/or for authorizing users or devices to access various services and service features offered by the particular network 30.

Similar to network 10, the traffic network portion 35 of the mobile communication network 30 connects to a public switched telephone network 19, to offer voice grade telephone call connections between mobile devices and regular telephones 21 connected to the PSTN 19. The traffic network portion 35 of the mobile communication network 30 also connects to a public packet switched data communication network, such as the network commonly referred to as the "Internet" shown at 23, for various mobile device communications with servers 25 and/or user terminal devices 27. Although omitted for simplicity, the network 30 may also include various systems that provide ancillary functions in support of the communications services provided through the network 30, such as a system similar to the OTAF 29 for providing data and/or programming downloads to the mobile devices of the network operator's customers.

The mobile devices 12, 13, and 33 may be configured to dial correct emergency numbers depending upon the country each user is in even if the user dials the emergency number associated with another country. To this end, the user may only have to remember to dial one emergency number (e.g., emergency number associated with the country in which the user resides). Irrespective of whether the user is in the country in which the user resides, once the user dials the emergency number, the mobile device determines the country the user is in, retrieves the appropriate emergency number for that country, and uses the correct dial digits to place the emergency call.

To illustrate, assume that the user of the mobile device 12 dials the emergency number 911 when the user is in the United States. Using the process 100, the mobile device recognizes that it is operating in the United States and that 911 is an emergency number for the United States. The mobile device transmits the emergency number 911 to the wireless network 10 servicing the mobile device 12.

In a slightly different scenario, when a user of device 33 travels outside of the United States to, for example, the United Kingdom, and dials the same emergency number 911, the mobile device 33 recognizes that the emergency number 911 associated with the United States has been dialed and determines the appropriate emergency number for the United Kingdom and will use the correct dial digits to place the emergency call. For example, referring to the tables in Appendix A, the mobile device 33 determines that the correct emergency number in United Kingdom is 999 or 112; replaces 911 with one of these numbers, and transmits the emergency number to the wireless network 30 servicing the mobile device 33. Moving forward, if the user dials 911 in a country (e.g., Algeria) that has separate numbers for medical, fire, or police emergency services, the mobile device 33 will provide the user with an option to select the desired emergency service. Once the user selects the desired emergency service, the mobile device 33 will place the call accordingly.

Those skilled in the art presumably are familiar with the structure, programming and operations of the various type of mobile stations. However, for completeness, it may be useful to consider the functional elements/aspects of exemplary mobile stations 12, 13, and 33, at a high-level.

Figure 3:
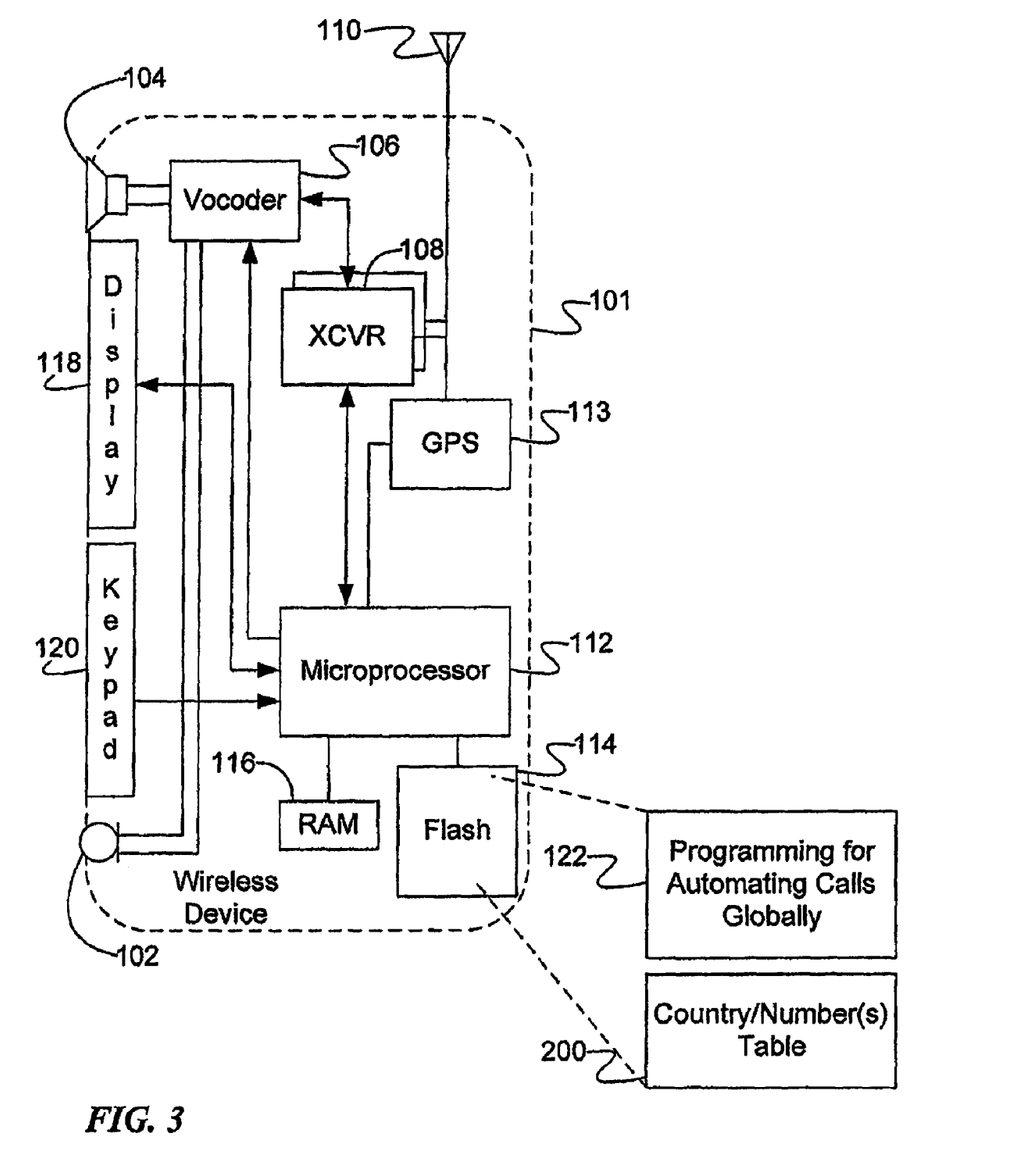

FIG. 3 provides a block diagram illustration of an exemplary wireless device 101, which may be the wireless device 12, 13 or 33 of a customer of any of the network operators. Although the wireless device 101 may be a smart-phone or may be incorporated into another device, such as a portable personal computer, personal digital assistant ("PDA") or the like, for discussion purposes, the illustration shows the wireless device 101 in the form of a handset. The handset embodiment of the wireless device 101 functions as a normal digital wireless telephone station. For that function, the wireless device 101 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the wireless device 101 also includes at least one digital transceiver ("XCVR") 108. The wireless devices 101 is a multimode device capable of operations on various technology type networks, such as the networks 10 and 30. For example, the wireless device 101 may utilize either or both of 3GPP2 (1XRTT and EVDO) technologies and 3GPP (LTE/GSM/UMTS) technologies. For that purpose, the XCVR 108 could be a multimode transceiver, or the wireless device 101 may include two or more transceivers each of which supports a subset of the various technologies or modes. The concepts discussed here encompass embodiments of the wireless device 101 utilizing any digital transceivers that conform to current or future developed digital wireless communication standards.

The XCVR 108 provides two-way wireless communication of information, such as vocoded speech samples and/or digital message information, in a selected one of the technology modes. The XCVR 108 also sends and receives a variety of signaling messages in support of the various voice and data services provided via the wireless device 101 and the communication network (described earlier with regard to FIG. 2). Each XCVR 108 connects through RF send and receive amplifiers (not separately shown) to an antenna 110. In the example, the XCVR 108 is configured for RF communication in accord with a digital wireless protocol, such as the current 3GPP2 and 3GPP protocols.

The wireless device 101 includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. In addition to normal telephone and data communication related input/output, these elements also may be used for display of menus and other information to the user and user input of selections, if needed during a system selection operation or during a selection software download operation. Various combinations of the keypad 120, display 118, microphone 102 and speaker 104 may be used as the physical input output elements of the GUI, for multimedia (e.g. audio and/or video) communications. Of course other user interface elements may be used, such as a stylus and touch sensitive display screen, as in a PDA or smart phone.

A microprocessor 112 serves as a programmable controller for the wireless device 101, in that it controls all operations of the wireless device 101 in accord with programming that it executes, for all normal operations, and for operations involved in selecting a preferred technology and selecting an available network of the appropriate technology type, for mobile communications. In the example, the wireless device 101 includes flash type program memory 114, for storage of various "software" or "firmware" program routines and mobile configuration settings, such as mobile directory number ("MDN") and/or mobile identification number ("MIN"), etc. The wireless device 101 may also include a non-volatile random access memory ("RAM") 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming for the wireless device 101, including programming 122 for automating emergency calls globally, is stored in the flash type program memory 114. The programming is sometimes referred to as "firmware," is loaded into and executed by the microprocessor 112. The country/numbers tables 200 shown in Appendix A is also stored in flash type program memory 114. The flash type program memory 114 also stores a table that includes the primary emergency numbers the mobile device is programmed to recognize. As noted above, the table may include the emergency numbers 911, 112, and 999 and their associative country (e.g., United States, Greece, and Bangladesh, respectively).

The executable program 122 stored in the flash memory 114 may include a program for enabling the wireless device 101 to dial a correct emergency number for the country in which the wireless device 101 is operating even if the user dials an emergency number associated with a country other than the country of operation. The wireless device 101 also includes a GPS 113. The GPS 113 may be used to identify the location of the wireless device 101.

As shown by the above discussion, the functionality for automating emergency calls globally may be implemented on a mobile device in a form programming. An example of the device has been discussed above relative to FIG. 3. The relevant software (programming and/or data) may be downloaded and/or updated from a computer platform, for example, from an OTAF server 29 or the like communicating with the mobile device via the network. For example, Appendix A may be updated in the mobile device via OTAF server 29 as changes occur to the content of the Appendix A. Although special purpose devices may be used to support the download and update functions, such devices also may be implemented using one or more hardware platforms intended to represent a general class of data processing device commonly used to run "server" and/or "client" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data for automating emergency calls globally. The programming code 122 for automating emergency calls is executable by the microprocessor 112 of the mobile device 101, e.g. from storage in the flash memory 114 or from the UICC 111. For downloading and installation, however, the software is stored within the general-purpose computer platform or the like serving as the OTAF system 29.

Figures 4, 5:
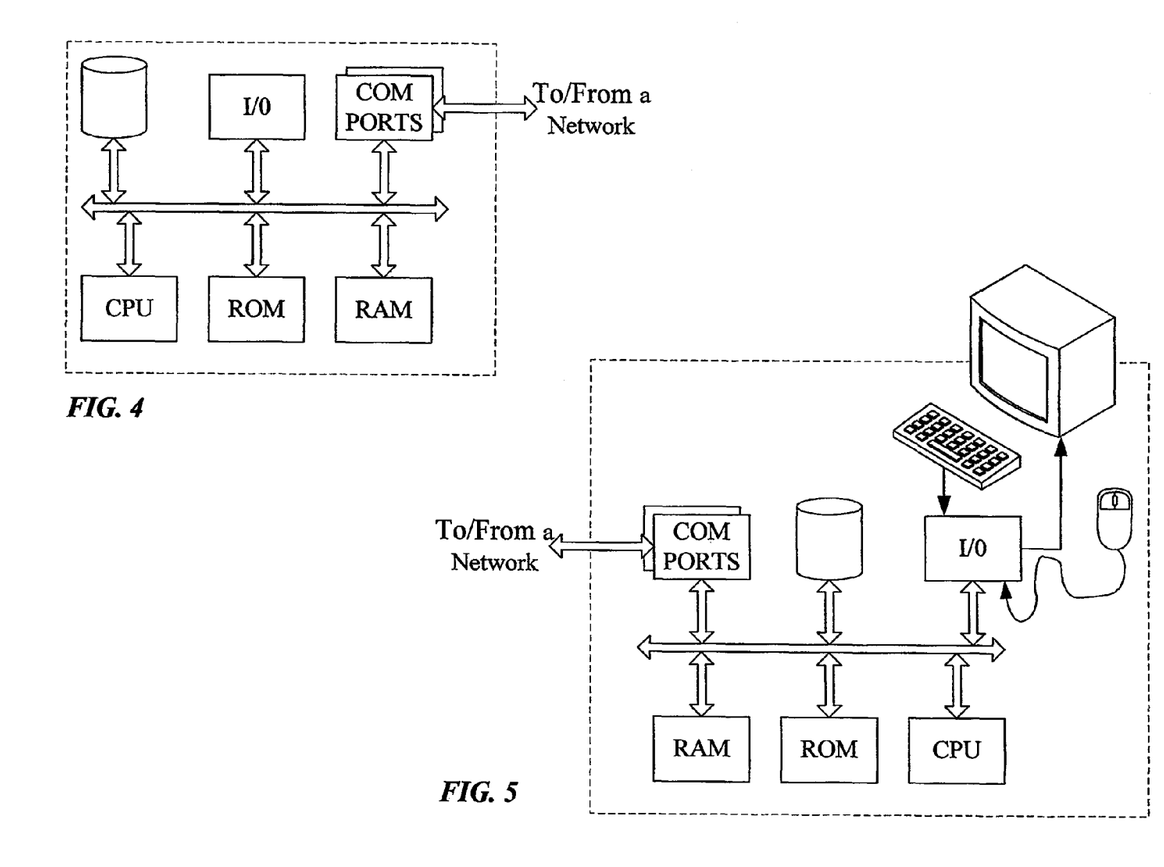
FIG. 4 is a simplified functional block diagram of a computer that may be configured as a host or server.
FIG. 5 is a simplified functional block diagram of a personal computer or other work station or terminal device.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer or other type of work station or terminal device, although the computer of FIG. 4 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit ("CPU"), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of automating emergency calls globally outlined above may be embodied in programming. Program or software aspects of the technology may be thought of as "products" or "articles of manufacture" typically in the form of executable code and/or associated data that is carried on or embodied in a type of machine readable medium. "Storage" type media include any or all of the memory of the mobile devices, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from a computer or processor into the mobile device, for example, from the OTAF server 29 or other computer of the network operator into the mobile device(s) of the operator's customer(s). Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, semiconductor memories of mobile devices, or optical or magnetic disks, such as any of the storage devices in any computer(s) or the like, such as may be used to implement the automated emergency calling techniques shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency ("RF") and infrared ("IR") data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions and/or associated data to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. For example, in one implementation, instead of the mobile device being programmed to recognize the emergency number associated with the home country or reference a table with three emergency numbers and their corresponding country, the mobile device is programmed to recognize the emergency number associated with the home country and other countries. To this end, when the user dial a number, the mobile device determines if the dialed number is an emergency number. For example, the mobile device may reference tables shown in Appendix A to determine whether the dialed number is an emergency number. Once the device determines that it is an emergency number the device determines whether it corresponds to the emergency number of the country of operation. If not, the device determines whether the country of operation includes a single emergency number or multiple emergency numbers. If the country of operation includes a single emergency number, the mobile device replaces the dialed emergency number with the emergency number associated with the country of operation and transmits the emergency number associated with the country of operation to the wireless network servicing the mobile device. If the number is dialed in a country that has multiple emergency numbers, then a drop down menu may show the numbers to the user and the user may be asked to select one of the displayed emergency numbers. Upon receiving the selection from the user, the mobile device transmits the selected emergency number to the wireless network servicing the mobile device. In another implementation, the mobile device may include a specific key for the emergency number selection of which may indicate to the mobile device the dialing of the emergency number and the corresponding country associated with the emergency number.

It is intended by the following claims to claim any and all applications, modifications and variations that fall within the true scope of the present teachings.

APPENDIX A

Tables Listing Countries and Corresponding Emergency Numbers

| Country | Police | Medical | Fire | Notes |
|---|---|---|---|---|
| Africa | | | | |
| Algeria | 17 | 14 | 14 | Counter Terrorist Unit - 1548; support for children - 3033. |
| Chad | 17 | | 18 | |
| Djibouti | 17 | | 18 | |
| Egypt | 122 | 123 | 180 | Tourist Police - 126; Traffic Police - 128; Electricity Emergency - 121; Natural Gas Supply Emergency - 129. |
| Ghana | 191 | 193 | 192 | 999 for any of the 3 services. |
| Mali | 17 | 15 | 18 | |
| Morocco | City 19 Country 177 | 15 | 15 | |
| Nigeria | 199 | 199 | 199 | 199 for any of the 3 services. |
| South Africa | 10111 | 10177 | 10111 | 112 from mobile phones (soon also from fixed line phones). |
| Tunisia | 197 | 190 | 198 | National guard - 193. |
| Rwanda | 112 | | | |
| Uganda | 999 | | | |
| Sudan | 999 | 999 | 999 | Traffic Police 777777 |
| Sierra Leone | 019 | 999 | | |
| Zambia | 999 | 991 | 993 | 112 from mobile phones (see www.zambiatourism.com/travel/listings/emergency.htm). |
| Zimbabwe | 995 | 994 | 993 | 999 for any of the 3 services. 112 from mobile phones |
| Asia | | | | |
| Bangladesh | 999 | | | For the cities of Dhaka and Chittagong only (Dhaka Metropolitan Police - "999" and Chittagong Metropolitan Police - "999") |

APPENDIX A-continued

Tables Listing Countries and Corresponding Emergency Numbers

| Country | Police | Medical | Fire | Notes |
|---|---|---|---|---|
| Bahrain | | 999 | | |
| China | Patrol: 110<br>Traffic: 122 | 120 | 119 | Traffic accident - 122.<br>999 for private ambulance service in Beijing, along with government owned ambulance service 120. |
| Myanmar | | 199 | | |
| Hong Kong | | 999 | | 992 (fax on fixed line; SMS on mobile phones - latter being only available to subscribers with disabilities); 112 from mobile phones (routes to any network service) |
| Taiwan | 110 | | 119 | |
| India | 100 | 102, 108, 104 | 101 | Traffic police - 103.<br>112 from any GSM handsets are redirected to the local emergency number.<br>Central Govt of India designate 108 as the national emergency contact number for Police, Medical and Fire emergencies.<br>Central Govt of India designate 104 as the Andhra pradesh state health advice emergency contact number for Medical emergencies. |
| Indonesia | 110 | 118/119 | 113 | Search and rescue team - 115; Natural disaster - 129; Electricity - 123; Mobile phone and satellite phone emergency number - 112. |
| Iran | 110 | 115 | 125 | 110 also serves as general relay. 112 also works for all emergencies from mobile phones. |
| Israel | 100 | 101 | 102 | 112 also works for all emergencies from mobile phones.<br>103 IEC.<br>106 For municipal hazards which are not emergencies, works in any municipality. |
| Japan | 110 | | 119 | Emergency at sea - 118. |
| South Korea | 112 | | 119 | National security hotline - 111; Reporting spies - 113; Reporting a child, mentally handicapped, or elderly person wandering - 182 (missing child report hotline); 114 connects to the phone service provider. |
| Kuwait | | 112 | | Used to be 777 |
| Lebanon | 112/999 | 140 | 175 | |
| Macau | | 999<br>318 | | |
| Maldives | | 102 | | Civil defence - 118; Police service - 119 can be dialed from mobile phones. |
| Malaysia | | 999 | | The worldwide emergency number for GSM mobile phones, 112 are redirected to the 999 call centre. |
| Mongolia | 102 | 103 | 101 | 100 |
| Nepal | 100/103 | | 101 | |
| Oman | | 9999 | | |
| Pakistan | 15/1122 | 115 | 16 | 15/1122 can be used to redirect to any service. 112 from any GSM handset will forward to the local emergency number. |
| Philippines | | 117 | | 112 and 911 redirect to 117. 112 and 911 can be dialed from mobile phones. 117 may also be texted from mobile phones. 136 for motorist assistance (Metro Manila only), 163 for child abuse (Bantay Bata) |

APPENDIX A-continued

Tables Listing Countries and Corresponding Emergency Numbers

| Country | Police | Medical | Fire | Notes |
|---|---|---|---|---|
| Qatar | | 999 | | |
| Saudi Arabia | 999 | 997 | 998 | Traffic police - 993; Rescue emergency - 911, 112 or 08 |
| Singapore | 999 | 995 | | Foreign travellers in Singapore with roaming hand phone facilities can dial either the 112 or 911 emergency numbers to reach an Emergency Call Centre in Singapore. |
| Sri Lanka | 119 or 118 | 110 | 111 | Accident service - 11-2691111. |
| Syria | 112 | 110 | 113 | |
| Thailand | 191 | 1669 | 199 | Bangkok EMS Command Center - 1646 (Bangkok only), Tourist Police "1155" (English speaking emergency and routine assistance). |
| United Arab Emirates | 999 or 112 | 998 or 999 | 997 | |
| Vietnam | 113 | 115 | 114 | |

Europe
The most common European emergency number 112 (following Directive 2002/22/EC - Universal Service Directive) and also standard on GSM mobile phones. 112 is used in Austria, Belgium, Bulgaria, Croatia, Cyprus, Czech Republic, Denmark, Estonia, Finland, France, Germany, Greece, Hungary, Iceland, Ireland, Italy, Latvia, Liechtenstein, Lithuania, Luxembourg, Republic of Macedonia, Malta, Netherlands, Norway, Poland, Portugal, Romania, Serbia, Slovakia, Slovenia, Spain, Sweden, Switzerland, Ukraine and the United Kingdom in addition to their other emergency numbers.

| Country | Police | Medical | Fire | Notes |
|---|---|---|---|---|
| Albania | 129 | 127 | 128 | Road police - 126 |
| Austria | | 112 | | Police - 133; Ambulance - 144; Fire - 122; Gas leaks - 128; Alpine rescue - 140; On-duty medical unit - 141; crisis-hotline - 142; support for children and teens - 147. |
| Belarus | 102 | 103 | 101 | Gas leaks - 104; also 112 is being redirected to 101 on velcom GSM-operator mobile phones. |
| Belgium | | 112 | | Police - 101; Ambulance/Firebrigade - 100; Missing children - 110; Mental problems/suicide - 106. |
| Bosnia and Herzegovina | 122 | 124 | 123 | From mobile phones, dial the international emergency numbers 112, 911 and 08 for information about the local emergency numbers that are to be dialed (122, 123 and 124). |
| Bulgaria | | 112 | | Police - 166, Ambulance - 150; Fire - 160. |
| Croatia | 92 | | 112 | Ambulance - 94; Fire - 93; Road help - 987. |
| Cyprus | | 112 | | Alternative numbers: 199 |
| Czech Republic | | 112 | | Police - 158; Ambulance - 155; Fire - 150; Municipal police - 156. |
| Denmark | | 112 (old number was 000) | | Nearest Police (non-urgent) - 114. |
| Estonia | | 112 | | Police - 110. |
| Faroe Islands | | 112 | | |
| Finland | | 112 | | |
| France | | 112 | | Police - 17; Hospital-based Ambulance (SAMU) - 15; Fire Service-based Ambulance - 18; Fire - 18. 112 calls are answered by 15 or 18 dispatchers, depending on the caller's location. 115 for homeless. |
| Germany | | 112 | | Police - 110; 116116 Block Emergency Electronic Authorisation e.g. credit cards |
| Greece | | 112 | | Police - 100; Ambulance - 166; Fire - 199; Forest fire - 191; Coast guard emergency intervention - 108; Counter-narcotics immediate intervention - 109. |

APPENDIX A-continued

Tables Listing Countries and Corresponding Emergency Numbers

| Country | Police | Medical | Fire | Notes |
|---|---|---|---|---|
| Hungary | | 112 | | Police - 107; Ambulance - 104; Fire - 105. |
| Iceland | | 112 | | Police in Reykjavik Capital Area Non-urgent - 4441000 |
| Ireland | | 999 (or 112 also works) | | 112 was recently introduced to meet EU requirements, The Irish telephone directory says "Dial 999 or 112 and ask for the emergency service you require". Gas leak: 1850 20 50 50, ESB (electric) emergencies 1850 372 999. Note: 112 calls will be redirected to 999. |
| Italy | | 112 | | Ambulance - 118; Fire - 115; (State Police) - 113; (Carabinieri) - 112; (Forest Service) - 1515; Guardia di Finanza (Customs/Financial Police) - 117; Coast guard - 1530 |
| Kazakhstan | | 112 | | Police - 102; Ambulance - 103; Fire - 101; Gas leaks 104. |
| Kosovo | | 911 | | The previous number used to be 112 like all ex-Yugoslav states, as of 2008 the number was changed to 911 for all emergency services. |
| Latvia | | 112 | | Police - 02; Ambulance - 03; Fire - 01; Gas leaks - 04. |
| Lithuania | | 112 | | Police - 02/102/022; Ambulance - 03/103/033; Fire - 01/101/011. The non-112 numbers are for separate emergency services differ in distinct telecommunications networks, whereas 112 is available on all networks. |
| Luxembourg | | 112 | | Police - 113. |
| Republic of Macedonia | | 112 | | Police - 192; Ambulance - 194; Fire - 193. |
| Malta | | 112 | | Previously: Police 191; Ambulance 196; Fire 199. |
| Moldova | 902 | 903 | 901 | 112 is being implemented by 2010. |
| Monaco | | 112 | | Police - 17, Ambulance, severe - 15; Ambulance, less severe - 18, Fire - 18. 112 calls are answered by 15 or 18 dispatchers, depending on the caller's location. 115 for homeless. |
| Montenegro | | 112 | | Police - 122; Ambulance - 124; Fire - 123. |
| Netherlands | | 112 | | Formerly 06-11. Police (non-urgent) - 0900-8844. Also 911 is being redirected to 112 on GSM mobile phones. |
| Norway | 112 | 113 | 110 | Police (non-urgent) - 02800. |
| Poland | | 112 | | Police - 997; Ambulance - 999; Fire - 998; Municipal wardens - 986; natural gas/LPG emergencies - 992. |
| Portugal | | 112 | | Forest fire 117 |
| Romania | | 112 | | Former short numbers: (Police) - 955; Ambulance - 961; (Firefighters) - 981; (Gendarmerie) - 956; Civil Protection - 982; Family Violence - 983 |
| Russia | | 112 | | Police (until 2012) - 02; Ambulance (until 2012) - 03; Fire (until 2012) 01; Gas leaks - 04. |
| San Marino | 113 | 118 | 115 | |
| Serbia | | 112 | | Police - 92; Ambulance - 94; Fire - 93 |
| Slovakia | | 112 | | Police - 158; Ambulance - 155; Fire - 150 |

APPENDIX A-continued

Tables Listing Countries and Corresponding Emergency Numbers

| Country | Police | Medical | Fire | Notes |
|---|---|---|---|---|
| Slovenia | 113 | 112 | | |
| Spain | | 112 | | National - 091; Local Police - 092; Ambulance - 061; Fire - 080, 085; Civil Guard - 062; Mossos d'Esquadra (Catalan police) 088 |
| Sweden | | 112 (old number was 90000) | | Non-urgent police - 11414 |
| Switzerland | | 112 | | Police - 117; Ambulance - 144; Fire - 118; Poison - 145; Road emergency - 140; Psychological support (free and anonymous) - 143; Psychological support for teens and children (free and anonymous) - 147; Helicopter air-rescue (Rega) - 1414 or by radio on 161.300 MHz; Air rescue (Air Glaciers) (in Valais only) - 1415.[10] |
| Turkey | 155 | 112 | 110 | Gendarmerie - 156; Coast Guard - 158 |
| Ukraine | | 112 | | Police - 102; Ambulance - 103; Fire - 101; Gas leaks - 104. |
| United Kingdom | | 999 or 112 | | In 2006 101 was made available as a non-emergency, non-free number for police and local authorities in a small number of areas in England and Wales. Gas emergency 0800 111 999 |
| Vatican City | 113 | 118 | 115 | Also 112 is being redirected to 113 on GSM mobile phones[12]. |
| Australia And Oceania | | | | |
| Australia | | 000 | | From a mobile phone - 112 or 000 State Emergency Service (ACT, VIC, NSW, QLD, SA) - 132 500; SES (WA) -1300 130 039; From a Textphone/TTY call the National Relay Service on 106; Non-emergency police - 131 444; Crime Stoppers - 1800 333 000; Threats to national security - 1800 123 400; |
| Fiji | 911 | | 9170 | |
| New Zealand | | 111 | | Urgent but not emergency police/traffic number *555 (from mobile phones only). Redirect connects many popular foreign emergency numbers. From mobile phones, the international emergency numbers 112, 911 and 08 also work. The 0800 161616 TTY and 0800 161610 fax numbers are operated by the police for all three services. |
| Solomon Islands | | 999 | | There are also local numbers for each service in each urban centre. These local numbers may be quicker than dialling 999.[11] |
| Vanuatu | | 112 | | |
| North America | | | | |
| Canada | | 911 | | Non-emergency 311 in certain areas. Some rural areas still lack 911 service. Also 112 is being redirected to 911 on GSM mobile phones. |
| Greenland | | 112 | | 112 only works from mobile phones, fixed line phones have to call the local police or hospital. |
| Mexico | | 066, 060, or 080 | | Some regions redirect 911 calls to the proper number. |
| Saint Pierre and Miquelon | 17 | 15 | 18 | |

APPENDIX A-continued

Tables Listing Countries and Corresponding Emergency Numbers

| Country | Police | Medical | Fire | Notes |
|---|---|---|---|---|
| Central America and the Caribbean | | | | |
| Guatemala | 110 | 120 | 123 | Note: The number 911 exists but this is only for Private Services like Medical Insurance. |
| El Salvador | | 911 | | |
| Costa Rica | | 911 | | |
| Panama | | 911 | | |
| Barbados | 211 | 511 | 311 | References: Police, Ambulance, Fire |
| Cayman Islands | | 911 | | |
| Dominican Republic | | 911 or 112 | | From a mobile phone - 112 or 911 Also 112 is being redirected to 911 on GSM mobile phones[12]. |
| Jamaica | 119 | 110 | | |
| Trinidad and Tobago | 999 | 990 | | |
| Nicaragua | | 118 | | |
| Honduras | | 199 | | |
| South America | | | | |
| Argentina | 101 | 107 | 100 | Emergency dispatcher for Buenos Aires (city), Santa Fe (city), Rosario (city), Salta and Buenos Aires (provinces) 911. |
| Bolivia | 110 | 118 | 119 | |
| Brazil | 190 | 192 | 193 | Federal highway police 191; federal police 194; civil police 197; state highway police 198; civil defense 199; human rights 100; emergency number for Mercosul area 128; 112 will be redirected to 190 when dialed from mobile phones and 911 will also be redirected to the police number (190) See also: Brazilian telephone numbering plan#Public utility. |
| Chile | 133 | 131 | 132 | |
| Colombia | | 112 or 123 (landlines and mobile phones) | | Traffic accidents 127, GAULA (anti-kidnapping) 165. More specialized three-digit numbers are available; check the local Yellow Pages for more information. |
| | 156 | 132 | 119 | |
| Ecuador | | 911 (landlines and mobile phones) | | All types of emergencies in Guayaquil (112 landlines, *112 mobile phones), traffic accidents in Guayaquil 103, red cross 131. |
| | 101 | 911 | 102 | |
| French Guyana | 17 | 15 | 18 | |
| Guyana | 911 | 913 | 912 | |
| Paraguay | | 911 | | |
| Peru | 105 | 117 | 116 | Civil defense (disasters) 115 - Domestic violence helpline 100 |
| Suriname | | 115 | | |
| Uruguay | | 911 | | |
| Venezuela | | 171 | | |

What is claimed is:

1. A method for automating an emergency call globally, the method comprising steps of:
    identifying, at the mobile device, a received number, associated with an outgoing call and received from a user, is a first emergency number;
    identifying, at the mobile device, a country associated with the first emergency number;
    identifying a country of operation of the mobile device at a time of receiving the first emergency number;
    determining whether the country of operation corresponds to the country associated with the first emergency number;
    upon determining that the country of operation does not correspond to the country associated with the first emergency number, determining a second emergency number associated with the country of operation; and
    automatically transmitting the second emergency number to a wireless network servicing the mobile device, instead of the first emergency number, to initiate the emergency call.

2. The method of claim 1, wherein:
    the first emergency number is 911, 112, or 999, and
    the country associated with the first emergency number is United States, Greece, or Bangladesh.

3. The method of claim 1, wherein the first emergency number is an emergency number associated with a home country of the mobile device.

4. The method of claim 3, wherein:
identifying the received number is the first emergency number includes programming the mobile device to compare the received number with a plurality of emergency numbers stored in the mobile device and based on the result of comparison determine that the received number is the first emergency number, and
the plurality of emergency numbers include at least one of 911, 112, and 999.

5. The method of claim 1, wherein identifying the country of operation includes identifying a country of operation utilizing a Global Positioning System ("GPS").

6. The method of claim 1, wherein determining the second emergency number includes referencing a table listing one or more emergency numbers associated with the country of operation.

7. The method of claim 1, wherein the step of determining the second emergency number comprises:
determining a plurality of emergency numbers associated with the country of operation;
displaying to the user of the mobile device the plurality of emergency numbers associated with the country of operation;
requesting the user of the mobile device to select one of the plurality of emergency numbers associated with the country of operation; and
in response to the request, receiving a selection of a particular emergency number from among the plurality of emergency numbers associated with the country of operation,
wherein the automatically transmitting step uses the particular emergency number as the second emergency number.

8. An article of manufacture comprising a machine-readable storage medium and a program for causing a mobile device to assist a user in making an emergency call globally, the program being embodied on, the machine-readable storage medium and including instructions that, when executed, cause the mobile device to:
identify, at the mobile device, a received number, associated with an outgoing call and received from a user, is a first emergency number;
identify, at the mobile device, a country associated with the first emergency number;
identify a country of operation of the mobile device at a time of receiving the first emergency number;
determine whether the country of operation corresponds to the country associated with the first emergency number;
upon determining that the country of operation does not correspond to the country associated with the first emergency number, determine a second emergency number associated with the country of operation; and
automatically transmit the second emergency number to a wireless network servicing the mobile device, instead of the first emergency number, to initiate the emergency call.

9. The article of manufacture of claim 8, wherein:
the first emergency number is 911, 112, or 999, and
the country associated with the first emergency number is United States, Greece, or Bangladesh.

10. The article of manufacture of claim 8, wherein the first emergency number is an emergency number associated with a home country of the mobile device.

11. The article of manufacture of claim 10, wherein:
to identify the received number is the first emergency number, the program includes instructions for causing the mobile device to compare the received number with a plurality of emergency numbers stored in the mobile device and based on the result of comparison determine that the received number is the first emergency number, and
the plurality of emergency numbers include at least one of 911, 112, and 999.

12. The article of manufacture of claim 8, wherein to determine the second emergency number, the program includes instructions for causing the mobile device to reference a table listing one or more emergency numbers associated with the country of operation.

13. The article of manufacture of claim 8, wherein:
to determine the second emergency number, the program includes instructions for causing the mobile device to:
determine a plurality of emergency numbers associated with the country of operation;
display to the user of the mobile device the plurality of emergency numbers associated with the country of operation;
request the user of the mobile device to select one of the plurality of emergency numbers associated with the country of operation; and
in response to the request, receive a selection of a particular emergency number from among the plurality of emergency numbers associated with the country of operation, and
to transmit the second emergency number, the program includes instructions for causing the mobile device to transmit the particular emergency number as the second emergency number.

14. A mobile device configured to perform assisted dialing operation, the mobile device comprising:
a processing device; and
a memory storing executable instructions for causing the processing device to:
identify, at the mobile device, a received number, associated with an outgoing call and received from a user, is a first emergency number;
identify, at the mobile device, a country associated with the first emergency number;
identify a country of operation of the mobile device at a time of receiving the first emergency number;
determine whether the country of operation corresponds to the country associated with the first emergency number;
upon determining that the country of operation does not correspond to the country associated with the first emergency number, determine a second emergency number associated with the country of operation;
automatically transmit the second emergency number to a wireless network servicing the mobile device, instead of the first emergency number, to initiate the emergency call.

15. The mobile device of claim 14, wherein:
to identify the received number is the first emergency number, the memory stores executable instructions for causing the processing device to compare the received number with a plurality of emergency numbers stored in the mobile device and based on the result of comparison determine that the received number is the first emergency number, and
the plurality of emergency numbers include at least one of 911, 112, and 999.

16. The mobile device of claim 14, wherein to determine the second emergency number, the memory stores executable instructions for causing the processing device to reference a table listing one or more emergency numbers associated with the country of operation.

17. The mobile device of claim 14, wherein:
to determine the second emergency number, the memory stores executable instructions for causing the processing device to:
  determines a plurality of emergency numbers associated with the country of operation;
  display to the user of the mobile device the plurality of emergency numbers associated with the country of operation;
  request the user of the mobile device to select one of the plurality of emergency numbers associated with the country of operation; and
  in response to the request, receive a selection of a particular emergency number from among the plurality of emergency numbers associated with the country of operation, and
to transmit the second emergency number, the memory stores executable instructions for causing the processing device to transmit the particular emergency number as the second emergency number.

* * * * *